(12) United States Patent
de Diego (10) Patent No.: US 10,207,471 B2
(45) Date of Patent: Feb. 19, 2019

(54) PERFORATED CERAMIC MATRIX COMPOSITE PLY, CERAMIC MATRIX COMPOSITE ARTICLE, AND METHOD FOR FORMING CERAMIC MATRIX COMPOSITE ARTICLE

(71) Applicant: GENERAL ELECTRIC COMPANY, Schenectady, NY (US)

(72) Inventor: Peter de Diego, Saluda, NC (US)

(73) Assignee: General Electric Company, Schenectady, NY (US)

( * ) Notice: Subject to any disclaimer, the term of this patent is extended or adjusted under 35 U.S.C. 154(b) by 178 days.

(21) Appl. No.: 15/146,288

(22) Filed: May 4, 2016

(65) Prior Publication Data
US 2017/0320232 A1 Nov. 9, 2017

(51) Int. Cl.
*F01D 5/14* (2006.01)
*F01D 5/18* (2006.01)
(Continued)

(52) U.S. Cl.
CPC ............... *B32B 1/08* (2013.01); *B32B 3/263* (2013.01); *B32B 3/266* (2013.01); *B32B 7/04* (2013.01);
(Continued)

(58) Field of Classification Search
None
See application file for complete search history.

(56) References Cited

U.S. PATENT DOCUMENTS 2,097,598 A * 11/1937 Pavlecka ................. B64C 3/18
52/574
3,298,142 A * 1/1967 Isaac ...................... B64C 27/46
137/355.26
(Continued)

FOREIGN PATENT DOCUMENTS

EP 0140257 A1 5/1985
EP 2248785 A1 * 11/2010 ............. B29C 70/20
(Continued)

OTHER PUBLICATIONS

Inyengar, Abstract for IN 20040102411, Mar. 2009 (Year: 2009).*
(Continued)

*Primary Examiner* — Jeffrey A Vonch
(74) *Attorney, Agent, or Firm* — Ernest G. Cusick; Frank A. Landgraff (57) ABSTRACT

A ceramic matrix composite article, method for forming the article, and perforated ply which may be incorporated therein are disclosed. The article includes at least one shell ply forming an exterior wall having first and second portions and defining a plenum. An annular brace formed of at least one structural support ply is disposed within the plenum, including a first integral portion integral with and part of the first portion of the exterior wall, a first curved portion extending from the first integral portion and curving across the article plenum to the second portion of the exterior wall, a second integral portion integral with and part of the second portion of the exterior wall, a second curved portion extending from the second integral portion and curving across the article plenum to the first curved portion, and an overlap in which the first and second curved portions are integral.

20 Claims, 7 Drawing Sheets

(51) Int. Cl.
  *F01D 5/28* (2006.01)
  *F01D 25/12* (2006.01)
  *C04B 35/76* (2006.01)
  *B32B 1/08* (2006.01)
  *B32B 3/24* (2006.01)
  *B32B 5/26* (2006.01)
  *B32B 7/04* (2006.01)
  *B32B 18/00* (2006.01)
  *C04B 37/00* (2006.01)
  *B32B 3/26* (2006.01)
  *C04B 35/64* (2006.01)
  *F01D 25/00* (2006.01)
  *C04B 35/52* (2006.01)
  *C04B 35/10* (2006.01)
  *C04B 35/565* (2006.01)
  *F01D 25/14* (2006.01)

(52) U.S. Cl.
  CPC ............. *B32B 18/00* (2013.01); *C04B 35/64* (2013.01); *C04B 35/76* (2013.01); *C04B 37/005* (2013.01); *F01D 5/147* (2013.01); *F01D 5/188* (2013.01); *F01D 5/189* (2013.01); *F01D 5/282* (2013.01); *F01D 25/005* (2013.01); *B32B 5/26* (2013.01); *B32B 2260/023* (2013.01); *B32B 2260/04* (2013.01); *B32B 2262/10* (2013.01); *B32B 2262/105* (2013.01); *B32B 2262/106* (2013.01); *B32B 2305/07* (2013.01); *B32B 2305/076* (2013.01); *B32B 2305/08* (2013.01); *B32B 2313/00* (2013.01); *B32B 2313/02* (2013.01); *B32B 2313/04* (2013.01); *B32B 2603/00* (2013.01); *C04B 35/10* (2013.01); *C04B 35/52* (2013.01); *C04B 35/521* (2013.01); *C04B 35/565* (2013.01); *C04B 2237/38* (2013.01); *C04B 2237/385* (2013.01); *C04B 2237/61* (2013.01); *C04B 2237/84* (2013.01); *F01D 5/284* (2013.01); *F01D 25/12* (2013.01); *F01D 25/14* (2013.01); *F05D 2240/12* (2013.01); *F05D 2240/128* (2013.01); *F05D 2240/14* (2013.01); *F05D 2240/15* (2013.01); *F05D 2240/301* (2013.01); *F05D 2250/141* (2013.01); *F05D 2250/231* (2013.01); *F05D 2260/201* (2013.01); *F05D 2300/2112* (2013.01); *F05D 2300/224* (2013.01); *F05D 2300/2261* (2013.01); *F05D 2300/6033* (2013.01); *Y10T 428/131* (2015.01); *Y10T 428/1314* (2015.01); *Y10T 428/24298* (2015.01); *Y10T 428/24322* (2015.01); *Y10T 428/24331* (2015.01); *Y10T 428/24612* (2015.01); *Y10T 428/24744* (2015.01)

(56) References Cited

U.S. PATENT DOCUMENTS

| | | | | |
|---|---|---|---|---|
| 3,444,925 A * | 5/1969 | Johnson | ................ | B22F 3/1115 165/10 |
| 3,623,204 A * | 11/1971 | Wagle | ................ | B21D 26/055 228/182 |
| 3,967,996 A * | 7/1976 | Kamov | ................ | B23P 15/04 156/156 |
| 4,037,990 A * | 7/1977 | Harris | ................ | F01D 5/3053 416/135 |
| 4,051,289 A * | 9/1977 | Adamson | ................ | B29C 70/08 428/113 |
| 4,276,331 A * | 6/1981 | Bothwell | ................ | B28B 19/0023 138/143 |
| 4,515,523 A | 5/1985 | North et al. | | |
| 4,617,072 A * | 10/1986 | Merz | ................ | B32B 3/20 156/89.25 |
| 4,822,660 A * | 4/1989 | Lipp | ................ | B32B 3/18 428/113 |
| 5,080,142 A * | 1/1992 | Calamito | ................ | D03D 11/02 139/384 R |
| 5,129,787 A * | 7/1992 | Violette | ................ | B29D 99/0028 416/217 |
| 5,240,376 A * | 8/1993 | Velicki | ................ | B21D 26/055 228/157 |
| 5,292,231 A * | 3/1994 | Lauzeille | ................ | F01D 5/282 416/229 A |
| 5,306,554 A * | 4/1994 | Harrison | ................ | B32B 18/00 264/640 |
| 5,372,868 A * | 12/1994 | Prewo | ................ | E04C 2/34 428/120 |
| 5,383,566 A * | 1/1995 | Johnson | ................ | B29C 53/824 220/562 |
| 5,415,715 A * | 5/1995 | Delage | ................ | B29D 99/0089 156/197 |
| 5,439,627 A * | 8/1995 | De Jager | ................ | B22F 1/0059 264/129 |
| 5,451,448 A * | 9/1995 | Sawko | ................ | B64G 1/50 139/384 R |
| 5,547,737 A * | 8/1996 | Evans | ................ | B29D 24/008 428/178 |
| 5,632,834 A * | 5/1997 | Ostertag | ................ | B32B 18/00 156/173 |
| 5,881,775 A * | 3/1999 | Owen | ................ | F16L 9/10 138/149 |
| 5,941,446 A * | 8/1999 | Yasui | ................ | B23K 20/02 228/157 |
| 5,981,023 A * | 11/1999 | Tozuka | ................ | B29B 11/16 428/105 |
| 6,280,550 B1 * | 8/2001 | Steibel | ................ | B32B 18/00 156/182 |
| 6,418,973 B1 * | 7/2002 | Cox | ................ | B32B 5/26 139/383 R |
| 6,431,837 B1 * | 8/2002 | Velicki | ................ | F01D 5/282 416/223 R |
| 6,441,341 B1 * | 8/2002 | Steibel | ................ | B23K 26/1476 219/121.71 |
| 6,451,416 B1 * | 9/2002 | Holowczak | ................ | B32B 18/00 264/125 |
| 6,616,782 B2 * | 9/2003 | Hanse | ................ | B22D 41/14 156/184 |
| 6,648,597 B1 * | 11/2003 | Widrig | ................ | C04B 37/001 415/200 |
| 6,660,115 B2 * | 12/2003 | Butler | ................ | B32B 18/00 156/245 |
| 6,689,246 B2 * | 2/2004 | Hirahara | ................ | B64C 3/18 156/242 |
| 6,709,230 B2 | 3/2004 | Morrison et al. | | |
| 6,896,841 B2 * | 5/2005 | Velicki | ................ | B29C 65/00 264/510 |
| 7,059,129 B2 * | 6/2006 | Zollinger | ................ | F01D 17/165 60/602 |
| 7,255,535 B2 | 8/2007 | Albrecht et al. | | |
| 7,435,058 B2 | 10/2008 | Campbell et al. | | |
| 7,600,979 B2 | 10/2009 | Steibel et al. | | |
| 8,052,391 B1 | 11/2011 | Brown | | |
| 8,206,098 B2 * | 6/2012 | Prill | ................ | F01D 5/284 415/200 |
| 8,491,981 B2 * | 7/2013 | Delfino | ................ | B32B 3/20 152/302 |
| 2002/0011047 A1 * | 1/2002 | Obeshaw | ................ | B21C 37/15 52/794.1 |
| 2002/0076541 A1 * | 6/2002 | Jarmon | ................ | C04B 35/806 428/312.6 |
| 2002/0164250 A1 * | 11/2002 | Chung | ................ | F01D 5/187 416/97 R |
| 2003/0059577 A1 * | 3/2003 | Morrison | ................ | B32B 3/18 428/166 |
| 2003/0118757 A1 * | 6/2003 | Bauer | ................ | B29C 43/006 428/34.1 |

(56) References Cited

U.S. PATENT DOCUMENTS

| | | | | |
|---|---|---|---|---|
| 2003/0146346 A1* | 8/2003 | Chapman, Jr. | ........ | B29C 66/721 244/123.3 |
| 2003/0173460 A1* | 9/2003 | Chapman, Jr. | .......... | B29C 53/60 244/123.3 |
| 2004/0120811 A1* | 6/2004 | Darkins, Jr. | ............ | F01D 9/042 415/191 |
| 2004/0221941 A1* | 11/2004 | Bouillon | ................... | B28B 1/44 156/155 |
| 2005/0017389 A1* | 1/2005 | Petervary | ................... | B26F 1/24 264/41 |
| 2005/0076504 A1* | 4/2005 | Morrison | ................ | F01D 5/282 29/889.72 |
| 2005/0118392 A1* | 6/2005 | Millard | ................... | C04B 35/14 428/131 |
| 2005/0238491 A1* | 10/2005 | Morrison | ................ | F01D 5/187 416/229 R |
| 2005/0254942 A1* | 11/2005 | Morrison | ................ | F01D 5/282 415/200 |
| 2007/0140835 A1* | 6/2007 | Albrecht | ................ | F01D 5/147 415/115 |
| 2007/0147996 A1* | 6/2007 | Campbell | ................ | F01D 5/08 416/95 |
| 2008/0025846 A1* | 1/2008 | Vance | .................... | F01D 5/147 416/233 |
| 2008/0124512 A1* | 5/2008 | Steibel | .................. | C04B 35/573 428/105 |
| 2008/0149255 A1* | 6/2008 | Whiteker | .............. | C04B 35/573 156/89.11 |
| 2008/0181766 A1* | 7/2008 | Campbell | ................ | F01D 5/14 415/116 |
| 2009/0004425 A1* | 1/2009 | Lehman | ................... | B32B 3/18 428/53 |
| 2009/0005232 A1* | 1/2009 | Hand | ........................ | B32B 3/12 501/95.2 |
| 2009/0014926 A1* | 1/2009 | Marini | .................. | C04B 35/111 264/635 |
| 2009/0072439 A1* | 3/2009 | Karem | .................... | F01D 5/147 264/258 |
| 2009/0110877 A1* | 4/2009 | Bernard | .................... | B26F 1/26 428/131 |
| 2009/0165924 A1* | 7/2009 | Steibel | .................... | F01D 5/147 156/89.11 |
| 2009/0263627 A1* | 10/2009 | Hand | ........................ | F02C 7/24 428/172 |
| 2010/0047061 A1* | 2/2010 | Morrison | .................. | F01D 9/04 415/173.1 |
| 2010/0054930 A1* | 3/2010 | Morrison | ................ | B22D 19/04 415/191 |
| 2010/0092300 A1* | 4/2010 | Jensen | .................. | F03D 1/0675 416/233 |
| 2010/0196637 A1* | 8/2010 | Lippert | ................ | B29C 70/345 428/36.1 |
| 2010/0284810 A1* | 11/2010 | Corman | .................. | B29C 70/20 416/179 |
| 2010/0322760 A1* | 12/2010 | Morrison | ................ | F01D 5/147 415/200 |
| 2011/0027098 A1* | 2/2011 | Noe | ...................... | C04B 35/573 416/241 B |
| 2011/0058934 A1* | 3/2011 | James | .................... | B21D 53/76 415/177 |
| 2011/0121109 A1* | 5/2011 | Charleux | ................ | C04B 35/565 239/601 |
| 2011/0206522 A1* | 8/2011 | Alvanos | ................ | F01D 5/282 416/204 R |
| 2011/0217166 A1* | 9/2011 | McMillan | ................ | F01D 5/147 415/229 |
| 2012/0055609 A1* | 3/2012 | Blanchard | ............... | B29C 70/24 156/89.11 |
| 2012/0171430 A1* | 7/2012 | Riedell | ................... | B32B 18/00 428/189 |
| 2012/0251309 A1* | 10/2012 | Beaujard | ................ | F01D 5/282 415/200 |
| 2012/0301306 A1* | 11/2012 | Alvanos | ................... | F01D 5/225 416/204 R |
| 2012/0301314 A1* | 11/2012 | Alvanos | ................... | C04B 37/00 416/230 |
| 2013/0239379 A1* | 9/2013 | Rajasingam | ............. | B29C 33/12 29/23.51 |
| 2013/0251939 A1* | 9/2013 | Kleinow | ................... | B32B 18/00 428/121 |
| 2014/0010662 A1* | 1/2014 | Duelm | .................... | F01D 5/147 416/230 |
| 2014/0048978 A1 | 2/2014 | Taxacher et al. | | |
| 2014/0093392 A1* | 4/2014 | Tibbott | ................... | F01D 5/189 416/97 R |
| 2014/0119931 A1* | 5/2014 | Datta | .................... | B29C 70/443 416/223 R |
| 2014/0127457 A1* | 5/2014 | Hillier | ..................... | B32B 3/266 428/137 |
| 2014/0193577 A1* | 7/2014 | Monaghan | ............... | F01D 5/282 427/248.1 |
| 2014/0321994 A1* | 10/2014 | Brzek | ...................... | F01D 25/12 415/175 |
| 2014/0349538 A1* | 11/2014 | Marchal | .................. | B29C 70/24 442/206 |
| 2014/0356151 A1 | 12/2014 | Fremont et al. | | |
| 2015/0016972 A1* | 1/2015 | Freeman | ................. | F01D 5/189 415/175 |
| 2015/0308922 A1* | 10/2015 | Cox | ........................ | G01M 9/04 73/147 |
| 2015/0377046 A1* | 12/2015 | Duelm | .................... | F01D 5/282 415/200 |
| 2016/0003072 A1* | 1/2016 | Chang | .................... | F01D 5/282 415/200 |
| 2016/0003106 A1* | 1/2016 | Fouquet | .................. | B32B 18/00 427/255.12 |
| 2016/0101561 A1 | 4/2016 | Walston et al. | | |
| 2016/0215634 A1* | 7/2016 | Walston | ................... | F01D 9/041 |
| 2016/0229755 A1* | 8/2016 | Luthra | .................... | C04B 35/80 |
| 2016/0258320 A1* | 9/2016 | Thomas | .................. | F01D 9/065 |
| 2016/0279884 A1* | 9/2016 | Cantwell | ............... | B29C 70/543 |
| 2016/0289127 A1* | 10/2016 | Ackerman | ............ | C04B 35/521 |
| 2016/0312626 A1* | 10/2016 | Schetzel | ................. | C04B 35/111 |
| 2017/0009600 A1* | 1/2017 | Grasso | .................... | F01D 5/189 |
| 2017/0122114 A1* | 5/2017 | Kittleson | ................ | B32B 18/00 |

FOREIGN PATENT DOCUMENTS

| | | | | |
|---|---|---|---|---|
| FR | 762784 A | * | 4/1934 | ............ B64C 3/185 |
| FR | 864429 A | * | 4/1941 | ............ B64C 1/061 |
| FR | 2696679 A1 | * | 4/1994 | ............ B32B 3/12 |
| GB | 290994 A | * | 9/1928 | ............ B64C 3/182 |
| JP | 61057312 A | * | 3/1986 | |
| JP | 10259071 A | * | 9/1998 | |
| JP | 2000219577 A | * | 8/2000 | |
| JP | 2003148105 A | * | 5/2003 | |
| RU | 2088764 C1 | * | 8/1997 | |
| WO | 2014/133721 A1 | | 9/2014 | |
| WO | WO-2015041823 A1 | * | 3/2015 | ............ C04B 35/80 |

OTHER PUBLICATIONS

Extended European Search Report and Opinion issued in connection with corresponding EP Application No. 17168627.2 dated Oct. 4, 2017.

* cited by examiner

PERFORATED CERAMIC MATRIX COMPOSITE PLY, CERAMIC MATRIX COMPOSITE ARTICLE, AND METHOD FOR FORMING CERAMIC MATRIX COMPOSITE ARTICLE

FIELD OF THE INVENTION

The present invention is directed to ceramic matrix composite (CMC) plies, CMC articles, and methods for forming CMC articles. More particularly, the present invention is directed to perforated CMC plies, CMC articles including integrated annular braces, and methods for forming CMC articles with integrated annular braces.

BACKGROUND OF THE INVENTION

Gas turbines are continuously being modified to provide increased efficiency and performance. These modifications include the ability to operate at higher temperatures and under harsher conditions, which often requires material modifications and/or coatings to protect components from such temperatures and conditions. As more modifications are introduced, additional challenges are realized.

One modification to increase performance and efficiency involves forming gas turbine components, such as, but not limited to, airfoils, buckets (blades), nozzles (vanes), shrouds, combustor liners, and heat shields from CMC. However, CMC components may be more susceptible to bending stresses and deformation than other structural materials such as superalloys.

Additionally, CMC is expensive, and paring sheets of CMC material to a required shape for a particular apparatus may produce significant amounts of CMC scrap. In addition, the paring process may introduce defects into the ply, and may require multiple paring steps to achieve a sufficiently precise conformation.

BRIEF DESCRIPTION OF THE INVENTION

In an exemplary embodiment, a CMC article includes at least one shell ply. The at least one shell ply forms an exterior wall of the CMC article and defines an article plenum within the exterior wall. The exterior wall includes a first portion and a second portion. The CMC article further includes a first annular brace disposed within the article plenum. The first annular brace includes a first integral portion, a first curved portion, a second integral portion, a second curved portion, and an overlap. The first integral portion is integral with and part of the first portion of the exterior wall. The first curved portion extends from the first integral portion and curves across the article plenum to the second portion of the exterior wall. The second integral portion is integral with and part of the second portion of the exterior wall. The second curved portion extends from the second integral portion and curves across the article plenum to the first curved portion. The first curved portion is integral with and part of the second curved portion in the overlap. The first annular brace is formed of at least one structural support ply.

In another exemplary embodiment, a perforated CMC ply includes a CMC composition and a plurality of apertures distributed across at least a portion of the ply. The CMC composition is selected from the group consisting of an aluminum oxide-fiber-reinforced aluminum oxide (Ox/Ox), a carbon-fiber-reinforced carbon (C/C), a carbon-fiber-reinforced silicon carbide (C/SiC), a silicon-carbide-fiber-reinforced silicon carbide (SiC/SiC), and combinations thereof. The plurality of apertures include aperture conformations selected from the group consisting of circles, ovals, ellipses, semicircles, crescents, triangles, squares, rectangles, annuli, chevrons, polygons, irregular shapes, rounded polygons, and combinations thereof. The ply includes a property of increased flexibility compared to a comparable ply lacking the plurality of apertures, and a property of increased consolidation, pyrolization, and densification efficiency compared to the comparable ply lacking the plurality of apertures.

In another exemplary embodiment, a method for forming a CMC article includes, disposing at least one structural support ply within an article plenum defined by at least one shell ply. The at least one structural support ply defines a first annular brace. The at least one shell ply forms an exterior wall of the CMC article having the article plenum within the exterior wall. The exterior wall includes a first portion and a second portion. A first integral portion of the at least one structural support ply is adjacent to and in contact with the first portion of the exterior wall. A first curved portion of the at least one structural support ply extends from the first integral portion and curves across the article plenum to the second portion of the exterior wall. A second integral portion of the at least one structural support ply is adjacent to and in contact with the second portion of the exterior wall. A second curved portion of the at least one structural support ply extends from the second integral portion and curves across the article plenum to the first curved portion, defining an overlap of the first curved portion and the second curved portion. The method further includes consolidating the at least one structural support ply and the at least one shell ply, pyrolizing the at least one structural support ply and the at least one shell ply, and densifying the at least one structural support ply and the at least one shell ply. Consolidating, pyrolizing, and densifying the at least one structural support ply and the at least one shell ply integrates the at least one structural support ply and the at least one shell ply where the at least one structural support ply contacts the at least one shell ply, and integrates the overlap of the at least one structural support ply.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are CMC plies, CMC articles, and methods for forming CMC articles. Embodiments of the present disclosure, in comparison to processes not utilizing one or more features disclosed herein, decrease costs, increase process efficiency, increase strength, decrease deformation susceptibility, decrease weight, increase cooling flow, increase operating temperature limits, increase bending stress resistance, increases stiffness, increase ply flexibility, increase durability, increase operating lifetime, or a combination thereof.

Figure 1:
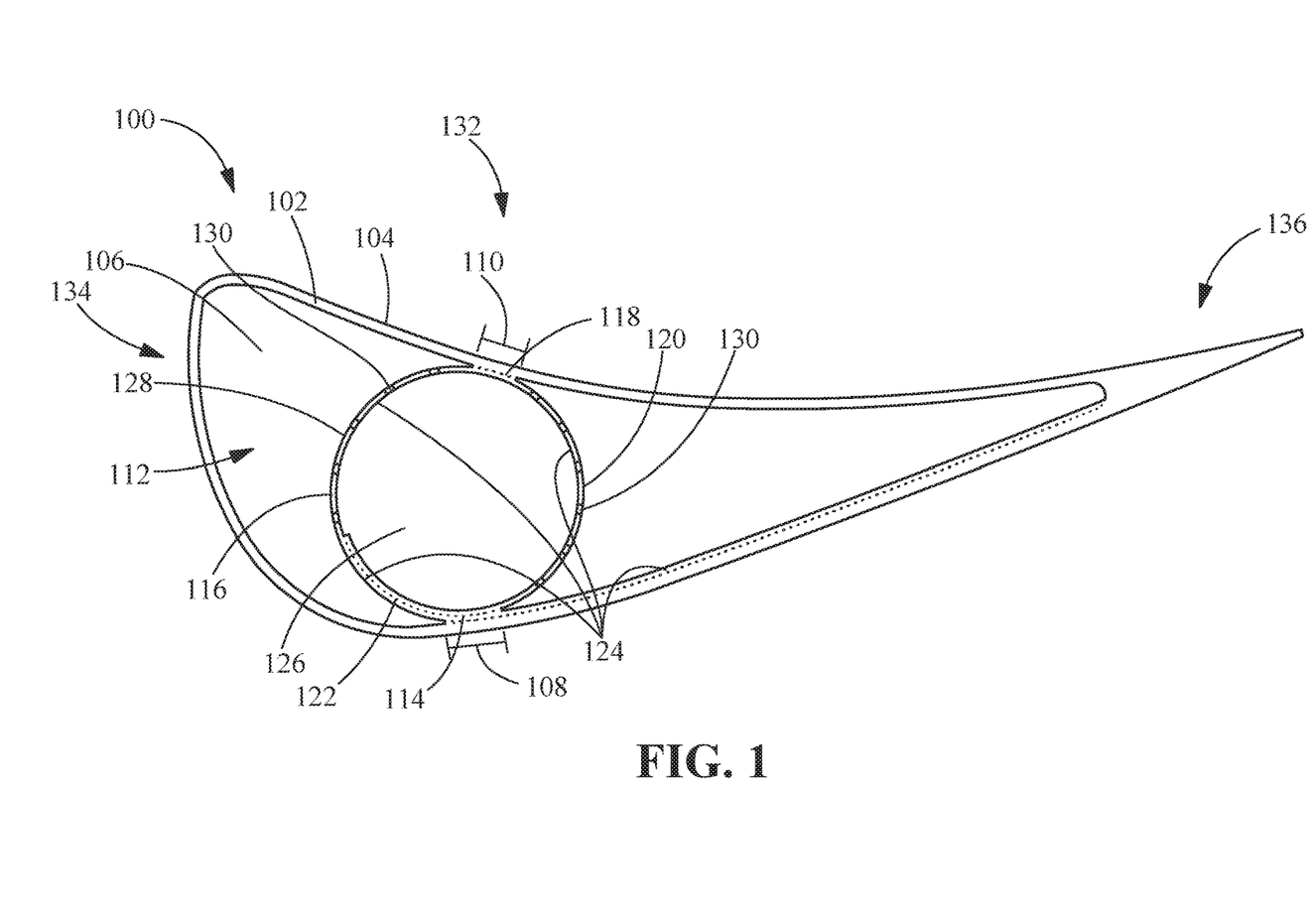
FIG. 1 is a cross-sectional view of a CMC article having one annular brace, according to an embodiment of the present disclosure.

Referring to FIG. 1, in one embodiment, a CMC article 100 includes at least one shell ply 102. The at least one shell ply 102 forms an exterior wall 104 of the CMC article 100 and defines an article plenum 106 within the exterior wall 104. The exterior wall 104 includes a first portion 108 and a second portion 110. The CMC article further includes a first annular brace 112 disposed within the article plenum 106. The first annular brace 112 includes a first integral portion 114, a first curved portion 116, a second integral portion 118, a second curved portion 120, and an overlap 122. The first integral portion 114 is integral with and part of the first portion 108 of the exterior wall 104. The first curved portion 116 extends from the first integral portion 114 and curves across the article plenum 106 to the second portion 110 of the exterior wall 104. The second integral portion 118 is integral with and part of the second portion 110 of the exterior wall 104. The second curved portion 120 extends from the second integral portion 118 and curves across the article plenum 106 to the first curved portion 116. The first curved portion 116 is integral with and part of the second curved portion 120 in the overlap 122. The first annular brace 112 is formed of at least one structural support ply 124.

As used herein, "integral with and part of" indicates that the references structures are of unitary construction, being of a piece, and are not merely adhered or bound together. In one embodiment, the at least one shell ply 102 and the at least one structural support ply 124 are consolidated and densified, and are free of adhesive and mechanical fasteners. As used herein, "free of adhesive and mechanical fasteners" specifically relates to a lack of adhesive and mechanical fasteners joining the at least one shell ply 102 to the at least one structural support ply 124, and does not prohibit in any way the usage of adhesives or mechanical fasteners to join the unitary at least one shell ply 102 and at least one structural support ply 124 to a separate structure with which the at least one shell ply 102 and at least one structural support ply 124 are not part of an integral with.

As used herein, "annular" indicates a shape which forms a complete loop, and which may be, but is not necessarily, generally circular, elliptical, or oval in aspect. The first annular brace may include any suitable cross-sectional conformation. In one embodiment, the suitable cross-sectional conformation may include, but is not limited to, a circle, an irregular circle, an ellipse, an irregular ellipse, an oval, an irregular oval, or a combination thereof. As used herein "irregular" refers to a shape which generally conforms to the described conformation but which includes local or general deviations from a standard geometrical understanding of the conformation.

The at least one shell ply 102 and the at least one structural support ply 124 may, independently, include, any suitable CMC composition. In one embodiment, the suitable CMC compositions include, but are not limited to, an aluminum oxide-fiber-reinforced aluminum oxide (Ox/Ox), a carbon-fiber-reinforced carbon (C/C), a carbon-fiber-reinforced silicon carbide (C/SiC), a silicon-carbide-fiber-reinforced silicon carbide (SiC/SiC), or a combination thereof.

The first annular brace 112 may define a first brace plenum 126 within the first annular brace 112. In one embodiment, the at least one structural support ply 124 of the first annular brace 112 includes a perforated CMC ply 128 including a plurality of apertures 130 between, and in fluid communication with, the article plenum 106 and the first brace plenum 126. The first brace plenum 126 may be in fluid communication with a cooling fluid source.

Figure 2:
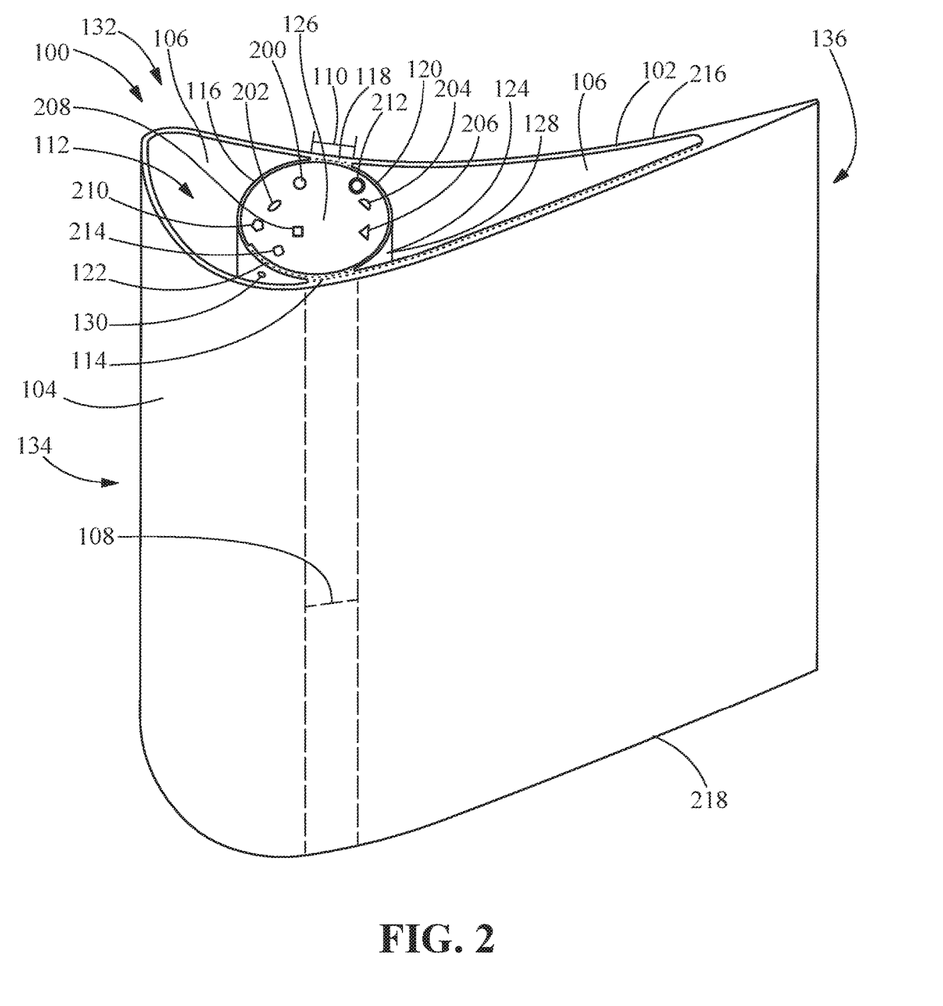
FIG. 2 is a perspective view of the CMC article of FIG. 1, according to an embodiment of the present disclosure.

Referring to FIG. 2, the plurality of apertures 130 may include any suitable aperture conformation, including, but not limited to, circles (200), ovals, ellipses 202, semicircles 204, crescents, triangles 206, squares 208, rectangles, pentagons 210, annuli 212, chevrons, polygons, irregular shapes, rounded polygons 214, and combinations thereof.

Figure 3:
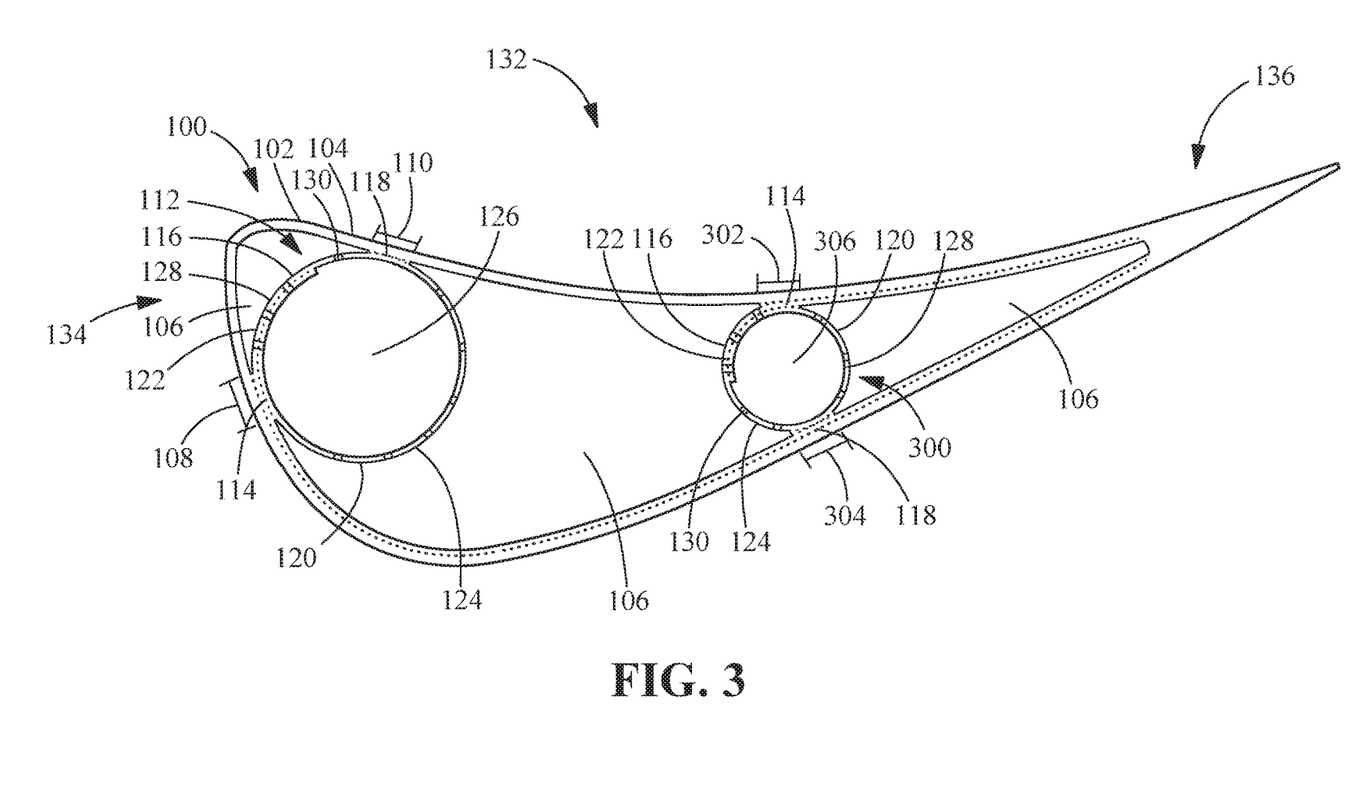
FIG. 3 is a cross-sectional view of a CMC article having two separated annular braces, according to an embodiment of the present disclosure.

Referring to FIG. 3, in one embodiment, the CMC article 100 further includes a second annular brace 300 disposed within the article plenum 106. The second annular brace 300 includes a first integral portion 114, a first curved portion 116, a second integral portion 118, a second curved portion 120, and an overlap 122. The first integral portion 114 is integral with and part of a third portion 302 of the exterior wall 104. The first curved portion 116 extends from the first integral portion 114 and curves across the article plenum 106 to the fourth portion 304 of the exterior wall 104. The second integral portion 118 is integral with and part of the fourth portion 304 of the exterior wall 104. The second curved portion 120 extends from the second integral portion 118 and curves across the article plenum 106 to the first curved portion 116. The first curved portion 116 is integral with and part of the second curved 120 portion in the overlap 122. The second annular brace 300 is formed of at least one structural support ply 124.

The second annular brace 300 may define a second brace plenum 306 within the second annular brace 300. In one embodiment, the at least one structural support ply 124 of the second annular brace 300 includes a perforated CMC ply 128 including a plurality of apertures 130 between, and in fluid communication with, the article plenum 106 and the second brace plenum 306.

Figure 4:
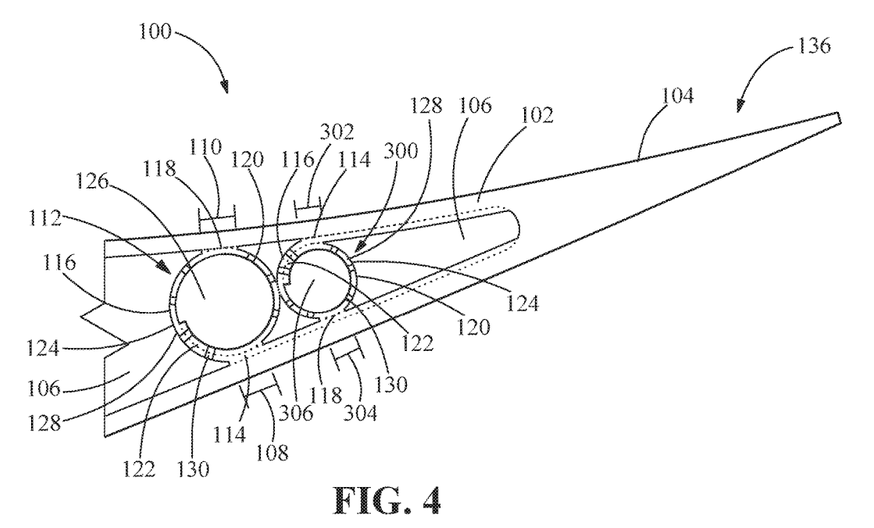
FIG. 4 is an expanded partial cross-sectional view of a CMC article having two adjacent annular braces, according to an embodiment of the present disclosure.
Figure 5:
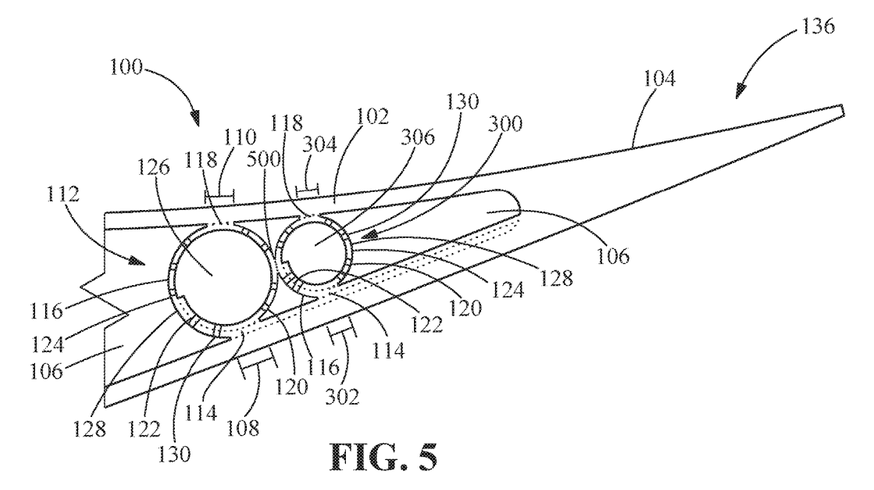
FIG. 5 is an expanded partial cross-sectional view of a CMC article having two integrated annular braces, according to an embodiment of the present disclosure.

Referring to FIGS. 3-5, in one embodiment (FIG. 3), the first annular brace 112 is remote from the second annular brace 300. In another embodiment (FIG. 4), the first annular brace 112 is adjacent to but distinct from the second annular brace 300. In yet another embodiment (FIG. 5), the first annular brace 112 is adjacent to the second annular brace 300, and the CMC article further including a contact region 500 in which the second curved portion of the first annular brace is integral with and part of the first curved portion of the second annular brace.

Referring to FIGS. 4 and 5, the first portion 108 of the exterior wall 104 may be adjacent to the fourth portion 304 of the exterior wall 104 and the second portion 110 of the exterior wall 104 may be adjacent to the third portion 302 of the exterior wall (FIG. 4), or the first portion 108 of the exterior wall 104 may be adjacent to the third portion 302 of the exterior wall 104 and the second portion 110 of the exterior wall 104 may be adjacent to the fourth portion 304 of the exterior wall 104.

The CMC article 100 may be any suitable article, including, but not limited to, a turbine component. Suitable turbine components may include, but are not limited to, an airfoil 132, a bucket (blade), a nozzle (vane), a shroud, a combustor liner, and a heat shield. In embodiment, a suitable article may be any article 100 which includes a sandwich-type structure in which there are two walls with a gas, fluid, or empty space disposed between the two walls.

Figure 6:
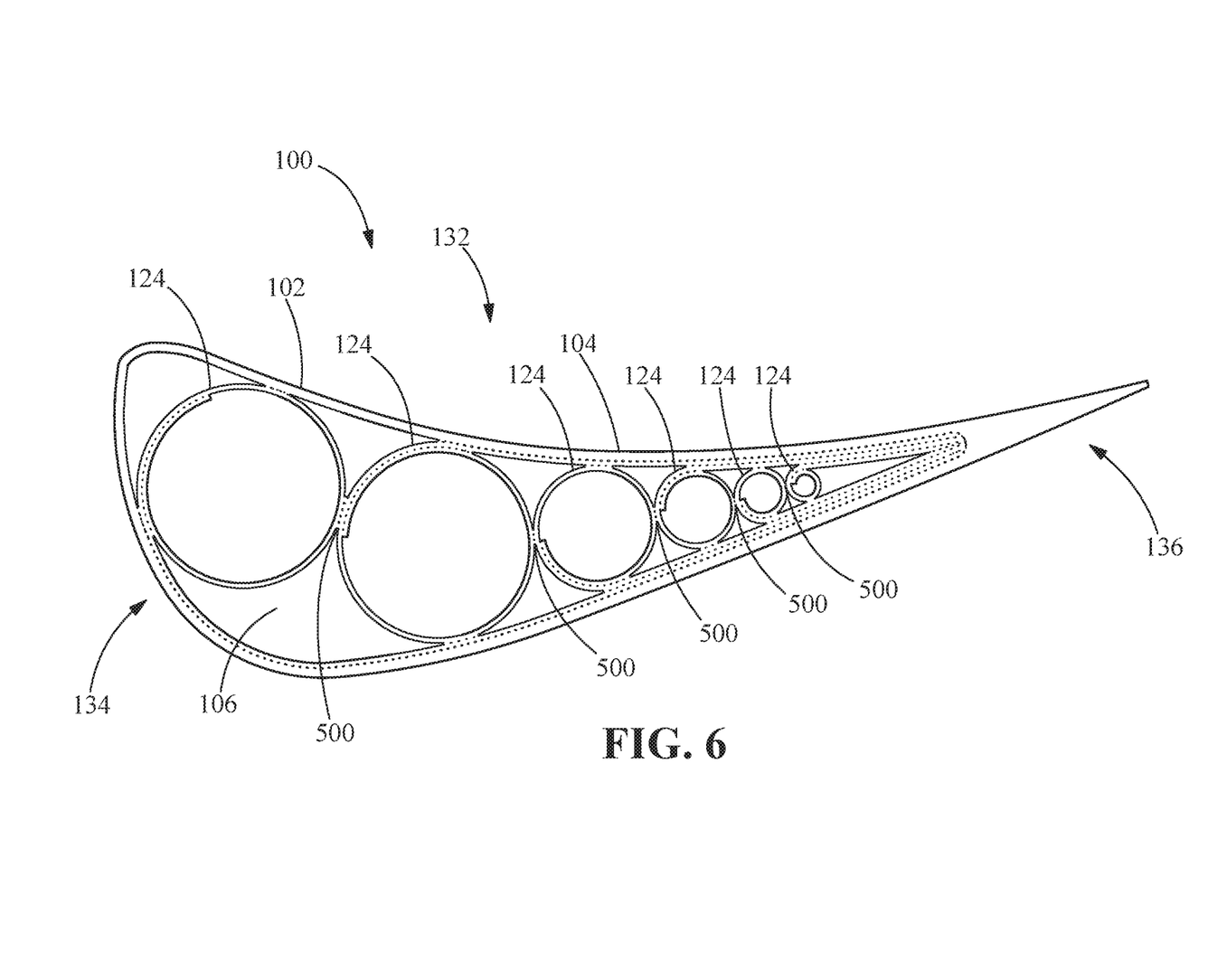
FIG. 6 is a cross-sectional view of a CMC article having five annular braces, according to an embodiment of the present disclosure.

Referring to FIG. 1-6, the CMC article 100 may include any suitable number of annular braces and the annular braces may be disposed in any suitable location within the exterior wall 104. The CMC article 100 may include a single annular brace (first annular brace 112 as shown in FIGS. 1 and 2), two annular braces (first annular brace 112 and second annular brace 300 as shown in FIGS. 3-5), or any number of additional annular braces (for example, six annular braces as shown in FIG. 6). In one embodiment, as shown in FIGS. 1-3, the first annular brace 112 is integral with a leading edge 134 of an airfoil 132. In another embodiment, as shown in FIGS. 4-5, the first annular brace 112 is integral with a trailing edge 136 of an airfoil 132.

The first annular brace 112 may have any suitable height. In one embodiment, the first annular brace 112 extends from a top 216 of an airfoil 132 to a bottom 218 of the airfoil 132. In another embodiment (not shown), in which the CMC article 100 is a bucket (blade), the first annular brace 112 extends from a top 216 of an airfoil 132 portion of the bucket (blade) to the bottom of a shank attached to the airfoil 132.

Referring to FIGS. 1 and 7-9, in one embodiment, a method for forming a CMC article 100 includes, disposing at least one structural support ply 124 within an article plenum 106 defined by at least one shell ply 102. The at least one structural support ply 124 defines a first annular brace 112. The at least one shell ply 102 forms an exterior wall 104 of the CMC article 100 having the article plenum 106 within the exterior wall 104. The exterior wall 104 includes a first portion 108 and a second portion 110. A first integral portion 114 of the at least one structural support ply 124 is adjacent to and in contact with the first portion 108 of the exterior wall 104. A first curved portion 116 of the at least one structural support ply 124 extends from the first integral portion 114 and curves across the article plenum 106 to the second portion 110 of the exterior wall 104. A second integral portion 118 of the at least one structural support ply 124 is adjacent to and in contact with the second portion 110 of the exterior wall 104. A second curved portion 120 of the at least one structural support ply 124 extends from the second integral portion 118 and curves across the article plenum 106 to the first curved portion 116, defining an overlap 122 of the first curved portion 116 and the second curved portion 120. The method further includes consolidating the at least one structural support ply 124 and the at least one shell ply 102, pyrolizing the at least one structural support ply 124 and the at least one shell ply 102, and densifying the at least one structural support ply 124 and the at least one shell ply 102. Consolidating, pyrolizing, and densifying the at least one structural support ply 124 and the at least one shell ply 102 integrates the at least one structural support ply 124 and the at least one shell ply 102 where the at least one structural support ply 124 contacts the at least one shell ply 102, and integrates the overlap 122 of the at least one structural support ply 124.

Figure 7:
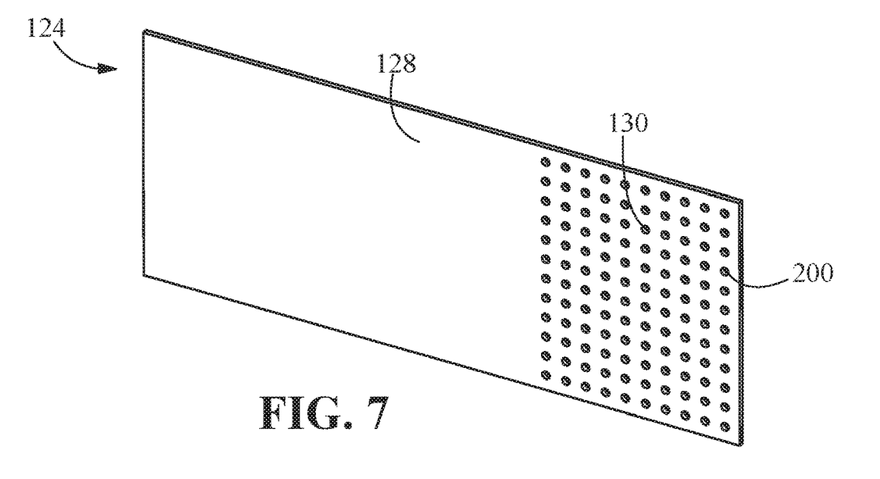
FIG. 7 is a perspective view of a perforated CMC ply, according to an embodiment of the present disclosure.
Figure 8:
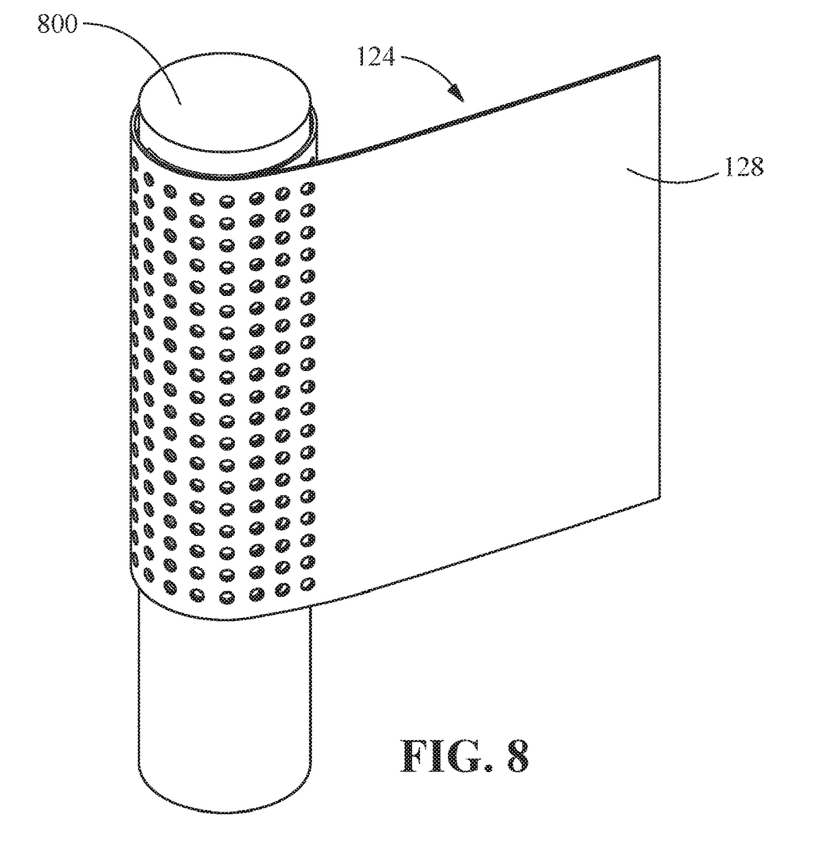
FIG. 8 is a perspective view of the perforated CMC ply of FIG. 7 wrapped around a ply-support mandrel, according to an embodiment of the present disclosure.
Figure 9:
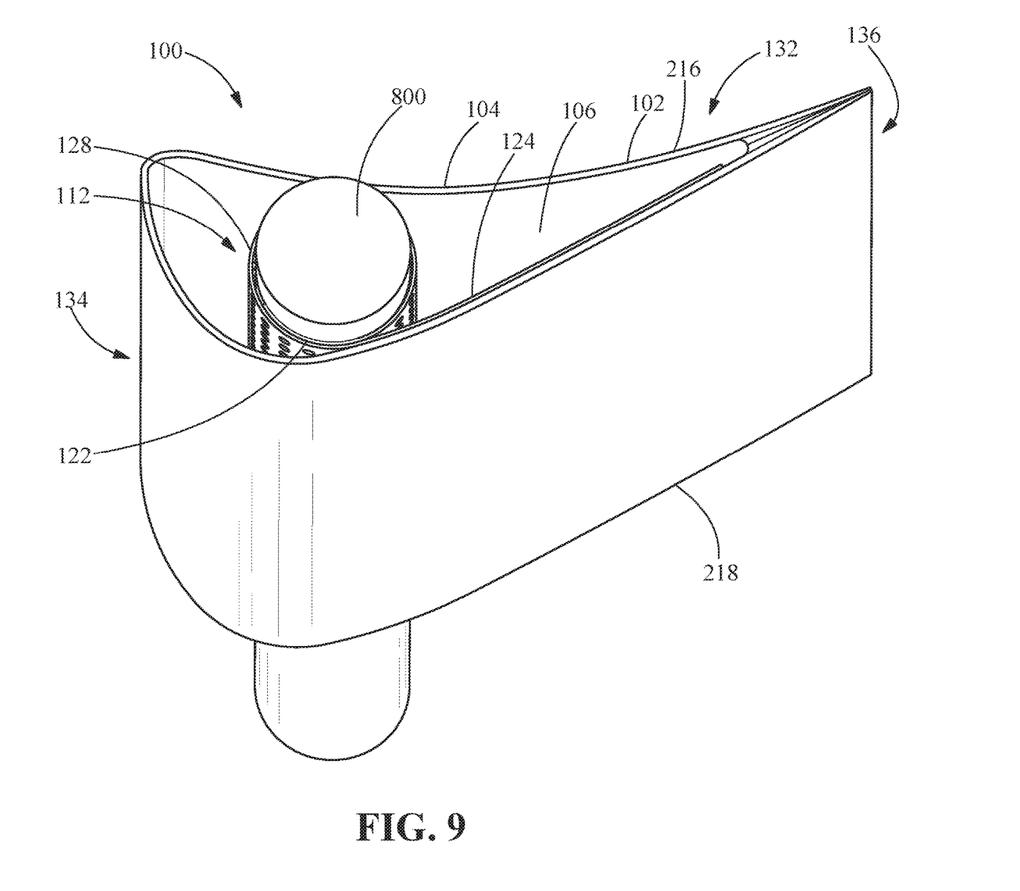
FIG. 9 is a perspective view of an unintegrated CMC article, according to an embodiment of the present disclosure.

Referring to FIGS. 7-9, in one embodiment, disposing the at least one structural support ply 124 in the at least one shell ply 102 includes applying the at least one structural support ply 124 to a ply-support mandrel 800 to define the first annular brace 112. As shown in FIG. 8, the at least one structural support ply 124 is wrapped around a full circumference of the ply-support mandrel 800, and the at least one structural support ply 124 is further wrapped around at least a partial circumference of the ply-support mandrel 800, defining the overlap 122. As shown in FIG. 9, the at least one shell ply 102 is applied to the at least one structural support ply 124 to form the exterior wall 104 of the CMC article 100 and define the article plenum 106. The ply-support mandrel 800 may be removed by any suitable method, including, but not limited to, melting out the ply-support mandrel 800 by heating the ply-support mandrel 800 to a temperature at or higher than the melting point of the material from which the ply-support mandrel is formed, but below the melting point of the material from which the at least one structural support ply 124 is formed.

Referring to FIG. 7, in one embodiment, the at least one structural support ply 124 is a perforated CMC ply 128. The perforated CMC ply 128 includes a CMC composition and a plurality of apertures 130 distributed across at least a portion of the perforated CMC ply 128. The perforated CMC composite ply 128 may include at least one of a property of increased flexibility compared to a comparable ply lacking the plurality of apertures 130, a property of increased consolidation, pyrolization, and densification efficiency compared to the comparable ply lacking the plurality of apertures 130, and a property of increased weight savings compared to the comparable ply lacking the plurality of apertures 130.

Referring to FIG. 9, in another embodiment, disposing the at least one structural support ply 124 in the at least one shell ply 102 includes forming at least one of the at least one structural support ply 124 and the at least one shell ply 102 by an additive manufacturing process to a near net shape. The additive manufacturing process may include, but is not limited to a three-dimensional printing process such as extruding a coated pre-impregnated tow by a continuous filament fabrication process. The three-dimensional printing process may further include the use of a three-dimensional continuous fiber placement printer to extrude the coated pre-impregnated tow by the continuous filament fabrication process.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite article, comprising:
at least one shell ply, the at least one shell ply comprising a ceramic matrix composite and the at least one shell ply forming an exterior wall of the ceramic matrix composite article and defining an article plenum within the exterior wall, the exterior wall including a first portion and a second portion; and a first annular brace disposed within the article plenum, wherein the first annular brace is formed of at least one structural support ply comprising a ceramic matrix composite, the first annular brace including:
  a first integral portion, the first integral portion being integral with and part of the first portion of the exterior wall;
  a first curved portion extending from the first integral portion, curving across the article plenum to the second portion of the exterior wall;
  a second integral portion, the second integral portion being integral with and part of the second portion of the exterior wall;
  a second curved portion extending from the second integral portion, curving across the article plenum to the first integral portion; and
  an overlap extending from the second curved portion, the overlap being integral with and part of the first integral portion and the first curved portion, wherein the overlap is formed by the at least one support ply overlapping onto itself and terminating in the first curved portion forming a thickened part of the first curved portion in relation to a non-overlapped part of the first curved portion.

2. The ceramic matrix composite article of claim 1, wherein the first annular brace defines a first brace plenum within the first annular brace.

3. The ceramic matrix composite article of claim 2, wherein the ceramic matrix composite of the at least one structural support ply of the first annular brace comprises a perforated ceramic matrix composite ply including a plurality of apertures between, and in fluid communication with, the article plenum and the first brace plenum.

4. The ceramic matrix composite article of claim 3, wherein the plurality of apertures include aperture conformations selected from the group consisting of circles, ovals, ellipses, semicircles, crescents, triangles, squares, rectangles, annuli, chevrons, polygons, irregular shapes, rounded polygons, and combinations thereof.

5. The ceramic matrix composite article of claim 1, further including a second annular brace disposed within the article plenum, wherein the second annular brace is formed of at least one structural support ply comprising a ceramic matrix composite, the second annular brace including:
  a first integral portion, the first integral portion being integral with and part of a third portion of the exterior wall;
  a first curved portion extending from the first integral portion, curving across the article plenum to a fourth portion of the exterior wall;
  a second integral portion, the second integral portion being integral with and part of the fourth portion of the exterior wall;
  a second curved portion extending from the second integral portion, curving across the article plenum to the first integral portion; and
  an overlap extending from the second curved portion, the overlap being integral with and part of the first integral portion and the first curved portion, wherein the overlap is formed by the at least one support ply overlapping onto itself and terminating in the first curved portion forming a thickened part of the first curved portion in relation to a non-overlapped part of the first curved portion.

6. The ceramic matrix composite article of claim 5, further including a contact region in which the second curved portion of the first annular brace is integral with and part of the first curved portion of the second annular brace.

7. The ceramic matrix composite article of claim 5, wherein the first portion of the exterior wall is adjacent to the fourth portion of the exterior wall and the second portion of the exterior wall is adjacent to the third portion of the exterior wall.

8. The ceramic matrix composite article of claim 5, wherein the first portion of the exterior wall is adjacent to the third portion of the exterior wall and the second portion of the exterior wall is adjacent to the fourth portion of the exterior wall.

9. The ceramic matrix composite article of claim 1, wherein the ceramic matrix composites of the at least one shell ply and at least one structural support ply each comprise a composition selected from the group consisting of an aluminum oxide-fiber-reinforced aluminum oxide (Ox/Ox), a carbon-fiber-reinforced carbon (C/C), a carbon-fiber-reinforced silicon carbide (C/SiC), and a silicon-carbide-fiber-reinforced silicon carbide (SiC/SiC), and combinations thereof.

10. The ceramic matrix composite article of claim 1, wherein the ceramic matrix composite article is a turbine component.

11. The ceramic matrix composite article of claim 10, wherein the turbine component is selected from the group consisting of an airfoil, a bucket (blade), a nozzle (vane), a shroud, a combustor liner, and a heat shield.

12. The ceramic matrix composite article of claim 11, wherein the component is an airfoil and the first annular brace is integral with a leading edge of the airfoil.

13. The ceramic matrix composite article of claim 11, wherein the component is an airfoil and the first annular brace is integral with a trailing edge of the airfoil.

14. The ceramic matrix composite article of claim 11, wherein the component is an airfoil and the first annular brace extends from a top of the airfoil to at least one of a bottom of the airfoil and the bottom of a shank attached to the airfoil, defining a first brace plenum within the first annular brace, the first annular brace including a plurality of apertures between, and in fluid communication with, the article plenum and the first brace plenum, the first brace plenum being in fluid communication with a cooling fluid source.

15. The ceramic matrix composite article of claim 1, wherein the at least one shell ply and the at least one structural support ply are consolidated and densified, and are free of adhesive and mechanical fasteners.

16. The ceramic matrix composite article of claim 1, wherein the first annular brace includes a cross-sectional conformation selected from the group consisting of a circle, an irregular circle, an ellipse, an irregular ellipse, an oval, an irregular oval, and combinations thereof.

17. A ceramic matrix composite article, comprising:
  at least one shell ply, the at least one shell ply comprising a ceramic matrix composite and the at least one shell ply forming an exterior wall of the ceramic matrix composite article and defining an article plenum within the exterior wall, the exterior wall including a first portion and a second portion; and
  a first annular brace disposed within the article plenum, wherein the first annular brace is formed of at least one structural support ply comprising a ceramic matrix composite, the first annular brace including:

a first integral portion, the first integral portion being integral with and part of the first portion of the exterior wall;
a first curved portion extending from the first integral portion, curving across the article plenum to the second portion of the exterior wall;
a second integral portion, the second integral portion being integral with and part of the second portion of the exterior wall;
a second curved portion extending from the second integral portion, curving across the article plenum to the first integral portion; and
an overlap extending from the second curved portion, the overlap being integral with and part of the first integral portion and the first curved portion, wherein the overlap is formed by the at least one support ply overlapping onto itself and terminating in the first curved portion forming a thickened part of the first curved portion in relation to a non-overlapped part of the first curved portion; and
a second annular brace disposed within the article plenum, wherein the second annular brace is formed of at least one structural support ply comprising a ceramic matrix composite, the second annular brace including:
a first integral portion, the first integral portion being integral with and part of a third portion of the exterior wall;
a first curved portion extending from the first integral portion, curving across the article plenum to a fourth portion of the exterior wall;
a second integral portion, the second integral portion being integral with and part of the fourth portion of the exterior wall;
a second curved portion extending from the second integral portion, curving across the article plenum to the first integral portion; and
an overlap extending from the second curved portion, the overlap being integral with and part of the first integral portion and the first curved portion, wherein the overlap is formed by the at least one support ply overlapping onto itself and terminating in the first curved portion forming a thickened part of the first curved portion in relation to a non-overlapped part of the first curved portion.

18. The ceramic matrix composite article of claim 17, further including a contact region in which the second curved portion of the first annular brace is integral with and part of the first curved portion of the second annular brace.

19. The ceramic matrix composite article of claim 17, wherein the first portion of the exterior wall is adjacent to the fourth portion of the exterior wall and the second portion of the exterior wall is adjacent to the third portion of the exterior wall.

20. The ceramic matrix composite article of claim 17, wherein the first portion of the exterior wall is adjacent to the third portion of the exterior wall and the second portion of the exterior wall is adjacent to the fourth portion of the exterior wall.

* * * * *